United States Patent
Templier et al.

(10) Patent No.: US 11,277,345 B2
(45) Date of Patent: Mar. 15, 2022

(54) METHOD FOR CONFIGURING AN AVIONIC NETWORK, COMPUTER PROGRAM PRODUCT AND RELATED CONFIGURATION MODULE

(71) Applicant: THALES, Courbevoie (FR)

(72) Inventors: Michael Templier, Toulouse (FR); Jean-Philippe Neuser, Toulouse (FR)

(73) Assignee: THALES, Courbevoie (FR)

( * ) Notice: Subject to any disclaimer, the term of this patent is extended or adjusted under 35 U.S.C. 154(b) by 81 days.

(21) Appl. No.: 16/723,710

(22) Filed: Dec. 20, 2019

(65) Prior Publication Data
US 2020/0213235 A1 Jul. 2, 2020

(30) Foreign Application Priority Data
Dec. 26, 2018 (FR) ...................................... 18 74162

(51) Int. Cl.
*H04L 12/851* (2013.01)
*H04L 47/2425* (2022.01)
(Continued)

(52) U.S. Cl.
CPC .......... *H04L 47/2433* (2013.01); *H04L 45/74* (2013.01); *H04L 67/12* (2013.01)

(58) Field of Classification Search
CPC ..... H04L 47/2433; H04L 45/74; H04L 67/12; H04L 12/413; H04L 49/351; H04L 2012/4028; H04L 47/32; H04L 47/2483; H04L 47/24; H04L 47/20; H04L 49/60; H04L 47/283; H04L 47/29; H04L 47/28; H04L 41/0803; H04L 45/38; H04L 45/306; H04L 47/2441

See application file for complete search history.

(56) References Cited

U.S. PATENT DOCUMENTS

2016/0294697 A1* 10/2016 Varadarajan ............ H04L 47/28

FOREIGN PATENT DOCUMENTS

EP 3076605 A1 10/2016

OTHER PUBLICATIONS

Finzi, A., et al., "Mixed-Critically on the AFDX Network: Challenges and Potential Solutions", Proceedings of the 9th European Congress Embedded Real Time Software arid Systems, XP055630254, pp. 1-9, (2018).

(Continued)

*Primary Examiner* — Huy D Vu
*Assistant Examiner* — Robert Ma
(74) *Attorney, Agent, or Firm* — Arent Fox LLP (57) ABSTRACT

The present invention relates to a method for configuring an avionic network comprising determining sending rules imposing the sending of digital data in the form of frames of a first type or a second type, each frame of the first type being according to the protocol of the ARINC 664 P7 type and each frame of the second type being according to the protocol of the Ethernet type with predetermined routing.
The method further comprises determining conveying rules comprising defining a path for each flow of the first type between a sending end system and a receiving end system, determining priority rules comprising defining a priority for each flow of the first type such that the priority of each flow of the second type is lower than the priority of each flow of the first type, and transmitting said rules.

12 Claims, 3 Drawing Sheets

(51) Int. Cl.
*H04L 45/74* (2022.01)
*H04L 67/12* (2022.01)

(56) References Cited

OTHER PUBLICATIONS

French Search Report issued by the the French Patent Office in corresponding French Application No. 1874162, dated Oct. 15, 2019.

* cited by examiner

METHOD FOR CONFIGURING AN AVIONIC NETWORK, COMPUTER PROGRAM PRODUCT AND RELATED CONFIGURATION MODULE

CROSS-REFERENCE TO RELATED APPLICATIONS

This application claims priority to French Patent Application No. 18 74162, filed on Dec. 26, 2018. The disclosure of the priority application is incorporated in its entirety herein by reference.

FIELD OF THE INVENTION

The present invention relates to a configuration method of an avionic network.

The present invention also relates to an associated computer program product and configuration module.

In particular, the invention makes it possible to implement a mixed avionic network of the ARINC 664 P7 and predetermined routing Ethernet types.

BACKGROUND OF THE INVENTION

In a manner known in itself, the ARINC 664 standard makes it possible to implement avionic computer networks. Based on the Ethernet standard, it in particular makes it possible to adapt the use of this standard to the avionic context, and in particular to avionic constraints.

Standard ARINC 664 is made up of several parts, each part being usable as a function of constraints imposed on data passing through the avionic network implemented according to this standard.

Among these parts, known in particular is the part referenced by "P7" and generally denoted by "ARINC 664 P7" or "ARINC 664 Part 7" or "AFDX®".

This part P7 is usable to transmit avionic data between different avionic systems implementing essential functions of the airplane and thus has the largest number of constraints.

Thus, an avionic network implemented according to part P7 has a segregated, redundant and deterministic network. The determinism of this network in particular means that each frame emitted reaches its destination in a known maximum time.

In certain avionic networks, it is also possible to use the Ethernet protocol (within the meaning of standard IEEE 802.3-2000 and subsequent versions) combined with a certain number of additional restrictions imposed by the nature of the corresponding network.

Compared with part P7 of standard ARINC 664, the Ethernet protocol with restrictions has fewer constraints and is thus usable to implement avionic networks transmitting less sensitive and/or less critical data.

These data generally present maintenance, download and service function data for the crew relative to different avionic systems. Thus, in case of loss of these data, they can be resent again without creating a considerable risk for the safety of the airplane.

The additional restrictions imposed on the Ethernet protocol can in particular relate to the manner in which frames are routed. Thus for example, this routing can be predetermined within each switch of the network, as a function of the identifier of the frame.

This is for example the case of the part referenced by "P3" of the ARINC 664 standard, which is also based on the Ethernet protocol but which has fewer constraints compared with part P7 and recommends, however, a network use configured statically for an operational mode on the airplane.

In an airplane, the networks of type ARINC 664 P7 and of the Ethernet type (optionally with additional restrictions) are segregated from one another. This segregation is obtained by using different physical means to implement these networks.

This in particular means that, in order to ensure such a segregation, these networks use switches and physically different transmission means.

One can then see that this type of segregation involves at least one doubling of each physical component implementing these networks. This then involves many problems in terms of bulk and weight in a structure accommodating these networks, such as an airplane.

In the state of the art, several examples of so-called mixed networks are already known, that is to say, networks of both the ARINC 664 P7 type and the Ethernet type.

Thus, according to one known example, this mixability is achieved by introducing a specific gateway between the networks of the two types making it possible to transmit frames between these networks. However, this solution does not decrease the number of physical components used and therefore does not satisfy the aforementioned bulk and weight problems.

According to another known example, an ARINC 664 P7 and Ethernet with predetermined routing mixability is achieved by using switches shared by these two types of networks, but including ports dedicated to each of these types. Although this solution makes it possible to decrease the number of switches used, it does not completely resolve the problems of bulk and weight, since different transmission means must still be used. Additionally, this solution multiplies the number of ports within a same switch, which makes its structure particularly complex.

SUMMARY OF THE INVENTION

The present invention aims to propose a method for building a mixed avionic network making it possible to use the same switches and the same transmission means for networks of the ARINC 664 P7 and Ethernet types, and therefore to more effectively address the aforementioned bulk and weight issues. In other words, the present invention aims to propose a construction method making it possible to build a mixed avionic network making it possible to use, for networks of the aforementioned ARINC 664 P7 and Ethernet types, the same physical layers therefore comprising the switches, the cabling and the shared transceiver ports.

To that end, the invention relates to a method for configuring a mixed avionic network formed by a communication system including a plurality of switches connected to one another; a plurality of end systems, and each end system sending and/or receiving digital data and being connected to at least one switch.

The method comprises the following steps:
determining sending rules imposing the sending of digital data in the form of frames of a first type or a second type, each frame of the first type being according to a first protocol, each frame of the second type being according to a second protocol different from the first protocol, the first protocol being of type ARINC 664 P7 and the second protocol being of the Ethernet type with predetermined routing;

each frame of each type including a field making it possible to determine its type and being defined by an identifier, the frames of the first type having a same identifier forming a flow of a first type, the frames of the second type having a same identifier forming a flow of a second type;

determining conveying rules comprising defining a path for each flow of the first type between a sending end system and a receiving end system;

determining priority rules comprising defining a priority for each flow of the first type such that the priority of each flow of the second type is lower than the priority of each flow of the first type; and sending said rules to the end systems and the switches.

According to other advantageous aspects of the invention, the method comprises one or more of the following features, considered alone or according to all technically possible combinations:

said field making it possible to determine the type of each frame corresponds to a header of this field;

a step for determining filtering rules imposing the application of a filtering operation to each frame of the second type received by a switch, each filtering operation being chosen from the group of operations comprising:

identifying the identifier of the corresponding frame and rejecting this frame when its identifier is not expected by the corresponding switch;

identifying the size of the corresponding frame and rejecting this frame when its size exceeds a predetermined threshold;

the sending rules further require defining, for each flow of the second type, a bandwidth allocation gap corresponding to a minimum sending interval of two consecutive frames of this flow;

the sending rules further require defining, for each flow of the second type, a bandwidth;

the bandwidth allocation gap and the bandwidth are defined for each flow of the second type independently of the bandwidths of the flows of the first type or as a function of the bandwidths of the flows of the first type;

the sending rules require defining, by each sending end system, a total bandwidth for all of the flows of the second type coming from this sending end system independently of the other sending end systems, and from this overall bandwidth, the bandwidth for each flow coming from this sending end system;

the sending rules require defining, by each sending end system, a total bandwidth for all of the flows of the second type coming from this sending end system as a function of the total bandwidths determined by the other sending end systems, and from this total bandwidth, the bandwidth for each flow coming from this sending end system;

the bandwidth for each flow of the second type coming from a sending end system is defined equitably between the set of flows of the second type coming from this sending end system or in a weighted manner as a function of the nature of this flow;

the bandwidth of each flow of the second type is defined as a function of the nature of this flow; and a step for determining control rules imposing the control by each switch for each entering flow of the second type of at least one of the following values:

bandwidth of this flow;

jitter;

bandwidth allocation gap.

The invention also relates to a computer program product including software instructions which, when implemented by computer equipment, carry out the method as previously defined.

The invention also relates to a configuration module of an avionic network comprising technical means configured to carry out the method as previously defined.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION OF THE INVENTION

Hereinafter, any mention of a standard, in particular a computer standard, refers to general principles of this standard that are well known by those skilled in the art and that are independent of different versions of this standard, unless otherwise explicitly mentioned.

First Embodiment

Figure 1:
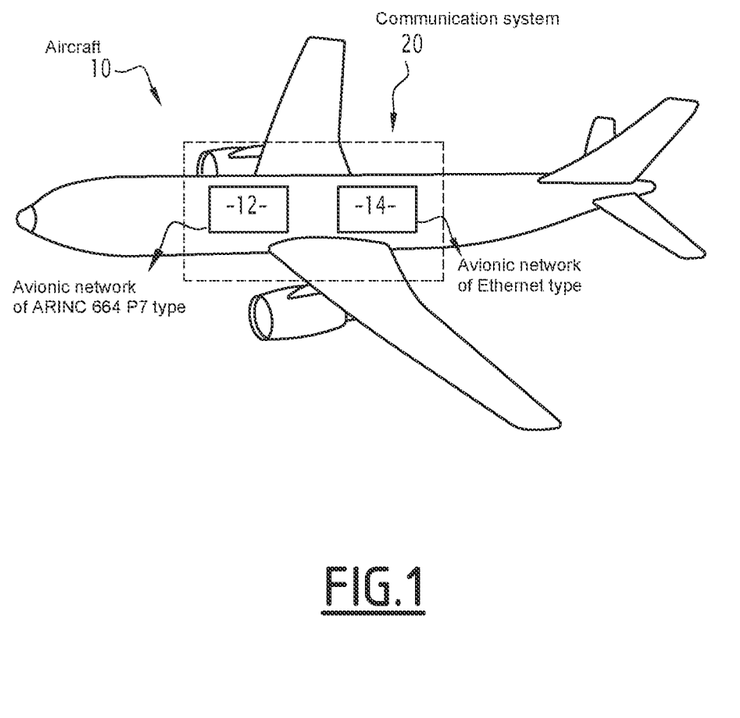
FIG. 1 is a schematic view of an aircraft including an avionic network of type ARINC 664 P7 and an avionic network of the Ethernet type with predetermined routing.

FIG. 1 illustrates an aircraft 10 such as an airplane.

The aircraft 10 comprises an avionic network 12 of type ARINC 664 P7 and an avionic network 14 of the Ethernet type with predetermined routing.

The avionic network 12 makes it possible to transmit sensitive data between different avionic systems. Sensitive data in particular refers to any data for which the loss or a transmission delay may affect the safety of the aircraft 10.

The avionic network 14 makes it possible to transmit less sensitive data compared with the avionic network 12. Thus for example, these data correspond to maintenance data exchanged between the aircraft 10 and the ground.

The avionic networks 12 and 14 are implemented by a same physical avionic communication system 20.

In other words, the avionic communication system 20 makes it possible to implement a mixed avionic network made up of two avionic networks 12, 14 of different natures.

Figure 2:
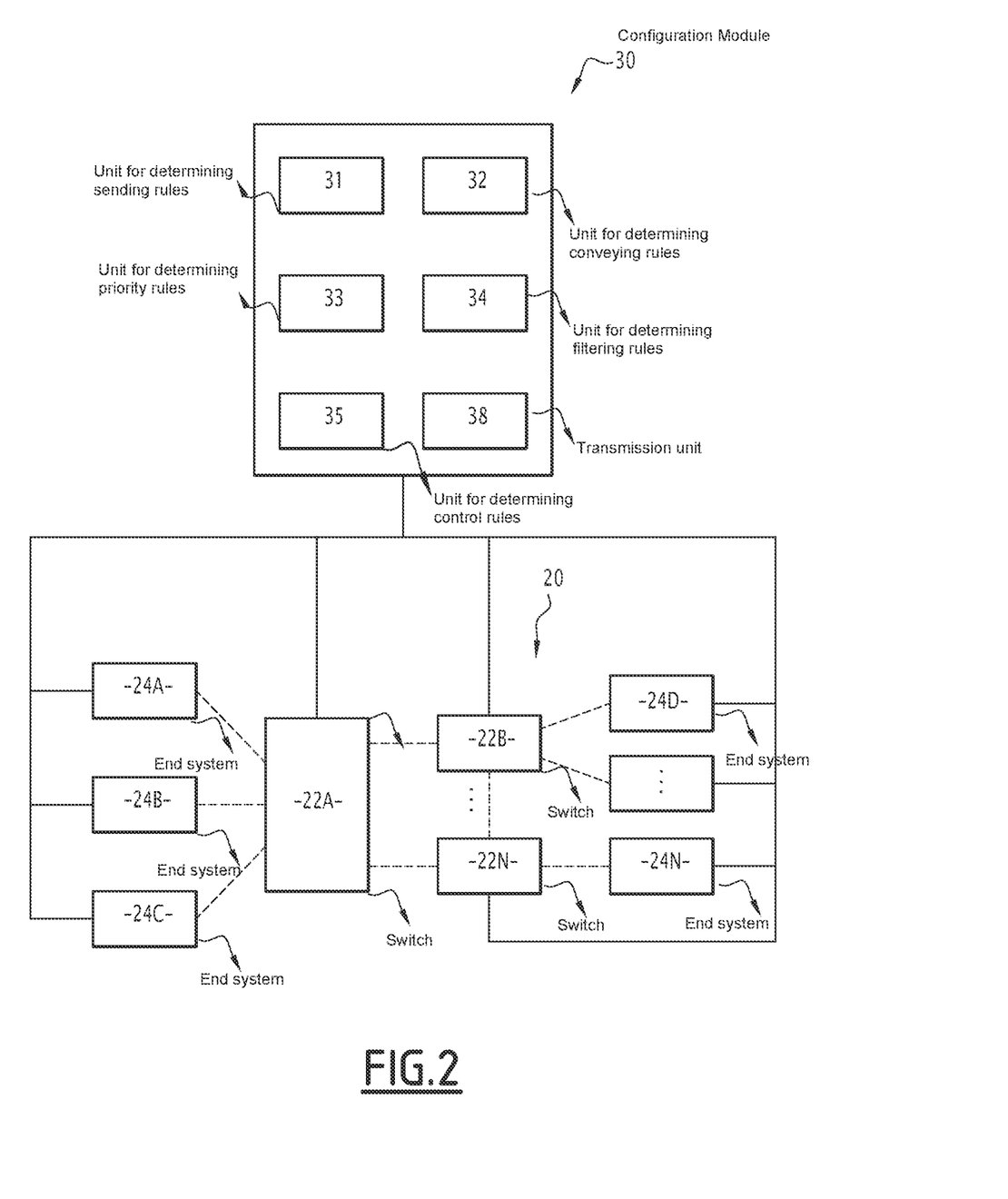
FIG. 2 is a schematic view of a communication system implementing a mixed avionic network made up of the avionic networks of FIG. 1, and a configuration module making it possible to configure this mixed avionic network, according to the invention.

One example of such an avionic communication system 20 is illustrated in FIG. 2.

Thus, in reference to this figure, this communication system 20 comprises a plurality of switches 22A, . . . , 22N and a plurality of end systems 24A, . . . , 24N.

Each end system 24A, . . . , 24N is integrated into an avionic system and ensures the communication of this system with the networks 12, 14.

Thus, as a function of the avionic system in which it is integrated, each end system 24A, . . . , 24N can send and/or receive digital data and comprises a configuration table making it possible to define the operation of this end system, as will be explained hereinafter.

Each end system 24A, . . . , 24N is connected to at least one of the switches 22A, . . . 22N via transmission means and via at least one port of this switch. The transmission means for example have a twisted pair cable or any other type of cable allowing a two-way data transmission.

Each switch 22A, . . . , 22N thus comprises a plurality of input and output ports, and a configuration table. Each input port is able to receive incoming digital data to send them to one or several output ports according to the configuration table of the corresponding switch, as will be explained in more detail hereinafter.

The switches 22A, . . . , 22N are coupled to one another by transmission means also for example having a twisted pair cable or any other type of cable allowing a two-way data transmission.

According to the invention, the configuration module 30 makes it possible to configure the operation of the communication system 20 and in particular of the switches 22A, . . . , 22N and the end systems 24A, . . . , 24N.

To that end, the configuration module 30 makes it possible to determine a plurality of operating rules of these elements and to send these rules to the communication system 20 for example upon startup thereof.

In particular, the configuration module 30 comprises a unit for determining sending rules 31, a unit for determining conveying rules 32, unit for determining priority rules 33, a unit for determining filtering rules 34, a unit for determining control rules 35 and a transmission unit 38.

According to an embodiment variant, the configuration module 30 assumes the form of an independent electronic device, in particular in the form of a computer. In this case, each of the units 31 to 38 at least partially assumes the form of software executable by this computer.

According to another embodiment variant, the configuration module 30 is integrated into an electronic device, and in particular into an existing computer. In this case, this module 30 as well as the units 31 to 38 at least partially assume the form of software executable by this computer.

According to still another variant, the configuration module 30 assumes the form of a plurality of computers. In this case, the units 31 to 38 can assume the form of software implemented by different computers.

In each of these variants, the units 31 to 38 can also at least partially assume the form of a programmable logic circuit of the FPGA (Field-Programmable Gate Array) or other type.

Unit for Determining Sending Rules

The unit for determining sending rules 31 makes it possible to determine rules for sending digital data in the communication system 20.

These rules are in particular intended for the end systems 24A, . . . , 24N and in particular for the sending end systems 24A, . . . , 24N.

Depending on the rules, the digital data sent in the communication system 20 must be sent in the form of frames of the first type or frames of the second type.

Each frame of the first type is according to a first protocol implementing the operation of the avionic network 12.

According to the invention, the first protocol is of type ARINC 664 P7.

Figure 3:
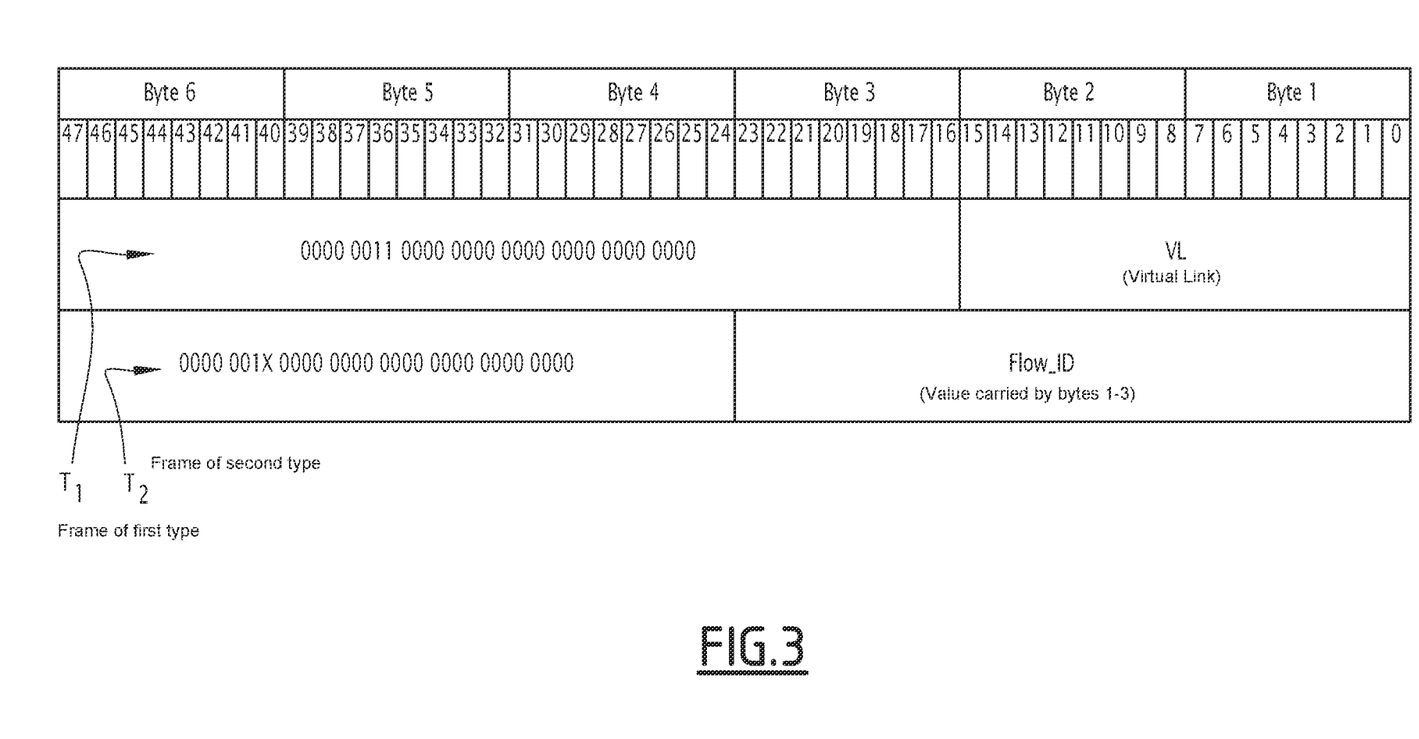
FIG. 3 is a schematic view of frames transmitted by the communication system of FIG. 2, according to one specific exemplary embodiment of this system.

Thus, each frame of the first type comprises a header in particular including a so-called "MAC DEST" frame that is illustrated schematically in FIG. 3 for a frame $T_1$ of the first type.

Thus, as illustrated in this figure, this field MAC DEST extends over 6 bytes.

In the case of the frame $T_1$, as is known in itself, the bytes 3 to 6 denoted in FIG. 3 by references Byte 3 to Byte 6 are reserved for a particular value, shared for all of the frames of the ARINC 664 P7 type. This value is equal to "0000 0011 0000 0000 0000 0000 0000 0000".

Furthermore, as is also known in itself, the bytes 1 and 2 of the frame $T_1$ denoted in FIG. 3 by the references Byte 1 to Byte 2 correspond to a value VL called "virtual link" and defining the path of the frame.

Furthermore, the frames of the first type including a same value VL form a same flow of the first type. The value VL is stored in the configuration table of each switch through which the flow corresponding to this value VL passes and thus makes it possible to convey each frame within this switch.

Within the meaning of the present invention, the value VL of each frame of the first type is called identifier of the corresponding frame.

Each frame of the second type is according to a second protocol implementing the operation of the avionic network 14.

According to the invention, the second protocol is of the Ethernet type (within the meaning of standard IEEE 802.3-2000 and later versions) with predetermined routing.

Hereinafter, "predetermined routing" refers to routing according to which each frame is conveyed by the switches 22A, . . . , 22N according to predetermined rules.

These predetermined rules define the path of each frame of the second type within each switch 22A, . . . , 22N and are determined by the unit 32 as will be explained hereinafter. Then, these rules are stored in the configuration table of each switch 22A, . . . , 22N.

Thus, for example, this is the case when the configuration table of each switch 22A, . . . , 22N defines, for each frame, an input port and one or several output ports, or when the configuration table of each switch 22A, . . . , 22N defines, for each frame, one or several output ports.

According to one specific exemplary embodiment of the invention, the frames of the second type are according to the ARINC 664 P3 protocol.

Each frame of the second type also comprises a header including bits reserved by the IEEE 802.3 standard.

Furthermore, when the frames of the second type are according to the ARINC 664 P3 protocol, this header also comprises a MAC DEST field illustrated in FIG. 3 for a frame $T_2$ of the second type.

According to the invention, the header of each frame of the second type, and in particular its bytes 3 to 6, can assume any value other than the corresponding bytes of the header of the frames of the first type, that is to say, any value other than the value "0000 0011 0000 0000 0000 0000 0000 0000".

This then makes it possible to safely distinguish the frames of the first type and the frames of the second type.

Furthermore, according to the invention, the header of each frame of the second type defines a value Flow_ID called "flow ID". This value Flow_ID is defined outside the bits reserved by standard IEEE 802.3 with a local Ethernet use.

The frames of the second type including a same Flow_ID value form a same flow of the second type. This value Flow_ID is stored in the configuration table of each switch through which the flow corresponding to this value Flow_ID passes. This allows this switch to identify each frame and to convey this frame in a predetermined manner, according to its configuration table.

Within the meaning of the present invention, the value Flow_ID of each frame of the second type is called identifier of the corresponding frame.

As illustrated in FIG. 3, for a frame $T_2$ according to protocol ARINC 664 P3, the value Flow_ID can for example be carried by bytes 1 to 3 of the field MAC DEST.

The sending rules further comprise defining a bandwidth allocation gap and a bandwidth for each flow of the first type.

The bandwidth allocation gap corresponds to a minimum sending interval of two consecutive frames of a same flow.

The bandwidth corresponds to the maximum throughput of frames of a same flow.

The bandwidth allocation gap (BAG) makes it possible in particular to define an authorized bandwidth for the corresponding flow.

Unit for Determining Conveying Rules

The unit for determining conveying rules 32 makes it possible to determine rules for conveying in the communication system 20 for each flow of each type.

These rules are in particular intended for the switches 22A, ..., 22N and define the routing of each frame from a sending end system to a receiving end system by passing through one or several switches 22A, ..., 22N.

Within each switch 22A, ..., 22N, for each flow of the first type, these rules define an input port and one or several output ports.

For each flow of the second type, these rules define one or several output ports and preferably an input port.

The conveying rules are for example determined as a function of the topology of the network.

Unit for Determining Priority Rules

The unit for determining priority rules 33 makes it possible to determine priority rules in the communication system 20 for each flow of each type.

These rules define the priority for sending and processing of frames and are in particular intended for the switches 22A, ..., 22N and the end systems 24A, ..., 24N.

In particular, as is known in itself, a priority level is defined for each flow of the first type. This priority level is for example chosen among for possible levels.

Furthermore, according to the invention, at least one priority level below each priority level of each flow of the first type, is chosen for each flow of the second type.

This priority level is for example defined for each second frame from the value Flow_ID of this frame.

Thus, during the operation of the communication system 20, each frame of the first type takes priority relative to each frame of the second type.

According to the invention, irrespective of the priority level of the frames of the second type, the latter is always lower than the priority level of each frame of the first type.

Of course, it is possible to define several priority levels for each flow of the second type if each of these levels remains lower than each priority level of each flow of the first type.

Unit for Determining Filtering Rules

The unit for determining filtering rules 34 makes it possible to determine filtering rules in the communication system 20 for each flow of the first type, as is known in itself.

These rules define filtering operations that are performed by each switch 22A, ..., 22N in relation with the incoming frames of the first type and are therefore intended for the switches 22A, ..., 22N.

In particular, each filtering operation applied to a frame of the first type corresponds to:

the identification of the identifier of the frame, that is to say, its value VL, and the rejection of this frame when its identifier is not expected by the corresponding switch; or identification of the size of the frame and rejection of this frame when its size exceeds a predetermined threshold.

According to one advantageous exemplary embodiment of the invention, the unit for determining filtering rules 34 makes it possible to determine, for each switch 22A, ..., 22N, filtering rules also in relation with each flow of the second type.

These rules for example make it possible to impose the same filtering operations on the switches 22A, ..., 22N as in the case of flows of the first type, or at least some of these rules.

Unit for Determining Control Rules

The unit for determining control rules 35 makes it possible to determine control rules by each switch 22A, ..., 22N of each flow of the first type.

Thus, as is known in itself, for each frame of the first type, the control done by each switch 22A, ..., 22N comprises controlling at least one of the following values:

bandwidth of this flow;
jitter;
bandwidth allocation gap.

Transmission Unit

The transmission unit 38 makes it possible to transmit all of the rules determined by the units 31 to 35 to the switches 22A, ..., 22N and/or to the end systems 24A, ..., 24N.

In particular, the transmission unit 38 makes it possible to recover all of the rules determined by the units 31 to 35 and to depict them in a form usable by each of the switches 22A, ..., 22N and/or end systems 24A, ..., 24N.

This usable form for example has a table or any other structure making it possible to program the operation of each switch 22A, ..., 22N and each end system 24N.

In particular, the usable form of these rules makes it possible to program the configuration tables of each switch 22A, ..., 22N and each end system 24A, ..., 24N so as to impose these rules on the operation of these elements. This programming is done according to methods known in themselves.

Furthermore, the transmission unit 38 makes it possible to transmit the determined rules to the switches 22A, ..., 22N and/or to the end systems 24A, ..., 24N upon starting up the communication system 28 or during maintenance thereof, for example by using specific control links provided to that end.

The configuration method of the avionic network will now be described.

This method is in particular implemented upon starting up the system 20 or during maintenance thereof.

The method is implemented by the configuration module 30 and comprises the following steps:

a step for determining sending rules;
a step for determining conveying rules;
a step for determining priority rules;
a step for determining filtering rules.

These steps are implemented in parallel or consecutively by the corresponding units 31 to 35.

The units 31 to 35 then determine the rules previously described and transmit them to the transmission unit 38.

Then, the method comprises a step for transmitting these rules to the switches 22A, ..., 22N and/or to the corresponding end systems 24, ..., 24N.

This step is implemented by the transmission unit 38, as was previously explained.

One can then see that the first embodiment of the invention makes it possible to configure a mixed avionic network of the ARINC 664 P7 and Ethernet types. This mixed network is thus able to work by using the same physical components of the system 20, that is to say, the same transmission means, the same switches and the same input and output ports.

This then makes it possible to decrease the bulk and the weight of the networks 12 and 14 embedded in the aircraft 10 considerably.

Additionally, according to the invention, the mixed network is configured such that the operation of the ARINC 664 P7 network is not significantly deteriorated, since the processing of the flows of this network remains identical to the processing applied in the conventional ARINC 664 P7 networks considering, in the design, the Ethernet flow to have the lowest additional priority level. In other words, during the sending, the system is not preemptive, which means that when a frame of the second type is being sent, this sending will be finalized, and in particular will not be interrupted if a frame of the second type arrives. The impact on the performance at each switch is therefore at most one frame of maximum size. Indeed, the flows of type ARINC 664 P7 always take priority relative to the flows of the Ethernet type.

The embodiments described hereinafter only relate to the determination of specific rules regarding the processing of flows of the second type by the end systems and/or the switches. These rules make it possible to make the network 14 more deterministic.

In particular, in each of these embodiments, the unit for determining sending rules 31 further makes it possible to determine sending rules imposing a bandwidth allocation and a bandwidth for each flow of the second type.

The flows of the second type are thus called "BAGged" in that properties similar to those of the flows of the first type are associated with these flows of the second type.

As will be explained hereinafter, the bandwidth allocations and the bandwidths can be defined directly by the unit for determining sending rules 31 or at least by some of the sending end system 24A, . . . , 24N.

Like for the case of the bandwidth allocations and the bandwidths of the flows of the first type, the sending rules make it possible to impose these bandwidth allocations and these bandwidths for the flows of the second type. These bandwidth allocations and these bandwidths are next stored in the configuration tables of the corresponding switches 22A, . . . , 22N and/or end systems 24A, . . . , 24N.

Furthermore, in each of these embodiments, the aforementioned control rules can also impose, on each switch 22A, . . . , 22N, the control of at least one of the following values, for each flow of the second type:
bandwidth of this flow;
jitter;
bandwidth allocation gap.

Second Embodiment

In a second embodiment, the bandwidth of each flow of the second type is defined independently of the bandwidths of the flow of the first type.

According to this embodiment, the bandwidths of the flows of the second type are therefore not guaranteed, since the flows of the first type continue to take priority relative to the flows of the second type.

Third Embodiment

In a third embodiment, the bandwidth of each flow of the second type is determined as a function of the bandwidths of the flow of the first type.

This in particular means that the bandwidth of each flow of the second type is defined as the remainder of the maximum bandwidth of the corresponding transmission means after subtracting the bandwidths of the corresponding flows of the first type and optionally taking into account the reserve frame bandwidths.

Fourth Embodiment

According to a fourth embodiment that can be combined with the second or third embodiment, the sending rules require defining, by each sending end system 24A, . . . , 24N, a total bandwidth for all of the flows of the second type coming from this sending end system 24A, . . . , 24N as a function of the total bandwidths determined by the other sending end systems 24A, . . . , 24N. The bandwidth for each flow coming from this sending end system 24A, . . . , 24N is defined from this total bandwidth.

In other words, according to this embodiment, the sending rules require that each sending end system 24A, . . . , 24N define a total bandwidth for all of the flows of the second type coming from this sending end system 24A, . . . , 24N independently of the other sending end systems 24A, . . . , 24N.

In this case, each total bandwidth is therefore defined locally. Then, from this total bandwidth, the sending rules allow the corresponding sending end system 24A, . . . , 24N to define the bandwidth for each flow coming from this sending end system equitably or in a weighted manner.

In particular, in the latter case, the corresponding sending end system can define a bandwidth for each of its flows for example as a function of the priority level of this flow, its nature, etc.

Fifth Embodiment

According to a fifth embodiment that can be combined with the second or third embodiment, the sending rules require that each sending end system 24A, . . . , 24N define a total bandwidth for all of the flows of the second type coming from this sending end system as a function of the total bandwidths determined by the other sending end systems 24A, . . . , 24N.

In this case, a same total bandwidth, corresponding to the minimum total bandwidth among all of the total bandwidths defined by the sending end systems 24A, . . . , 24N, is assigned to each of the sending end systems 24A, . . . , 24N.

Then, like in the previous case, from the total bandwidth, the sending rules allow each sending end system to define a bandwidth for each of its flows equitably or in a weighted manner.

Sixth Embodiment

According to a sixth embodiment that can be combined with the second or third embodiment, the bandwidth and the bandwidth allocation for each flow of the second type are determined automatically by the unit for determining sending rules 31.

This can be done in an optimized manner by taking account of all of the constraints of the mixed network, for example as a function of the priority levels of the flows of the second type, their nature, the topology of the network, etc.

Of course, other embodiments, and in particular different ways of determining bandwidths of the flows of the second type, are also possible.

The invention claimed is:

1. A method for configuring a mixed avionic network formed by a communication system including:

a plurality of switches connected to one another;

a plurality of end systems, each end system sending or receiving digital data and being connected to at least one switch;

the method comprising the following steps:

determining sending rules imposing the sending of digital data in the form of frames of a first type or a second type, each frame of the first type being according to a first protocol of type ARINC 664 P7, each frame of the second type being according to a second protocol of type ARINC 664 P3;

each frame of each type including a field making it possible to determine its type and being defined by an identifier, the frames of the first type having a same identifier forming a flow of a first type, the frames of the second type having a same identifier forming a flow of a second type, wherein the sending rules further define, for each flow of the second type, a bandwidth;

determining conveying rules comprising defining a path for each flow of the first type between a sending end system and a receiving end system;

determining priority rules comprising defining a priority for each flow of the first type such that the priority of each flow of the second type is lower than the priority of each flow of the first type; and sending said rules to the end systems and the switches.

2. The method according to claim 1, wherein said field making it possible to determine the type of each frame corresponds to a header of this field.

3. The method according to claim 1, further comprising a step for determining filtering rules imposing the application of a filtering operation to each frame of the second type received by a switch, each filtering operation being chosen from the group of operations consisting of:

identifying the identifier of the corresponding frame and rejecting this frame when its identifier is not expected by the corresponding switch; and identifying the size of the corresponding frame and rejecting this frame when its size exceeds a predetermined threshold.

4. The method according to claim 1 wherein the sending rules further require defining, for each flow of the second type, a bandwidth allocation gap corresponding to a minimum sending interval of two consecutive frames of this flow.

5. The method according to claim 4, wherein the bandwidth allocation gap and the bandwidth are defined for each flow of the second type independently of the bandwidths of the flows of the first type or as a function of the bandwidths of the flows of the first type.

6. The method according to claim 1, wherein the sending rules require defining, by each sending end system, a total bandwidth for all of the flows of the second type coming from this sending end system independently of the other sending end systems, and from this overall bandwidth, the bandwidth for each flow coming from this sending end system.

7. The method according to claim 1, wherein the sending rules require defining, by each sending end system, a total bandwidth for all of the flows of the second type coming from this sending end system as a function of the total bandwidths determined by the other sending end systems, and from this total bandwidth, the bandwidth for each flow coming from this sending end system.

8. The method according to claim 6, wherein the bandwidth for each flow of the second type coming from a sending end system is defined equitably between the set of flows of the second type coming from this sending end system or in a weighted manner as a function of the nature of this flow.

9. The method according to claim 1, wherein the bandwidth of each flow of the second type is defined as a function of the nature of this flow.

10. The method according to claim 4, further including a step for determining control rules imposing the control by each switch for each entering flow of the second type of at least one of the following values:

bandwidth of this flow;

jitter;

bandwidth allocation gap.

11. A computer program product comprising software instructions which, when implemented by a piece of computer equipment, carry out the method according to claim 1.

12. A configuration module of a mixed avionic network comprising technical means configured to carry out the method according to claim 1.

* * * * *